May 20, 1930.   H. W. SMITH   1,759,469
INSTRUMENT ILLUMINATOR
Filed July 14, 1928

INVENTOR
BY Harold W. Smith
Moses & Nolte
ATTORNEYS

Patented May 20, 1930

1,759,469

UNITED STATES PATENT OFFICE

HAROLD W. SMITH, OF PORT HURON, MICHIGAN

INSTRUMENT ILLUMINATOR

Application filed July 14, 1928. Serial No. 292,879.

This invention relates to automobile instruments and more especially to automobile instrument illuminators.

It is the primary purpose of this invention to provide means whereby the illuminator means employed to render visible the indications of a single instrument may be made to illuminate other instruments or parts of the vehicle.

Another object of this invention lies in the provision of means for controlling the illumination cast by lighting devices employed to render visible automobile instruments and to selectively direct the illumination where and as described.

A further purpose of this invention lies in the providing of means for utilizing a single illuminating source primarily designed for illuminating a single instrument, to illuminate other instruments also, and in providing simple means for directing and controlling the illumination of the last mentioned instruments without affecting the illumination of the single instrument primarily illuminated.

This invention also has for an object the provision of novel and useful means for illuminating the body compartment of a motor vehicle without adding to the number or arrangement of the illuminating sources already in use therein and without added investment therein.

The attached drawings, their description, and the appended claims will make clear the means of accomplishing the above set forth objects and certain other novel and useful improvements.

Figure 5:
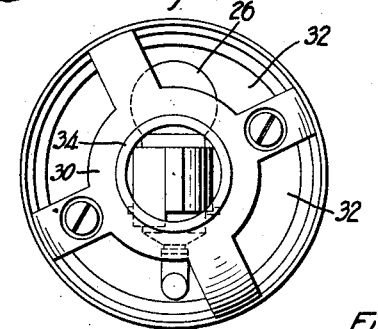
Figure 5 illustrates in fragmentary elevation the rear portion of the instrument casing with the shutter and clamping devices removed.
Figure 6:
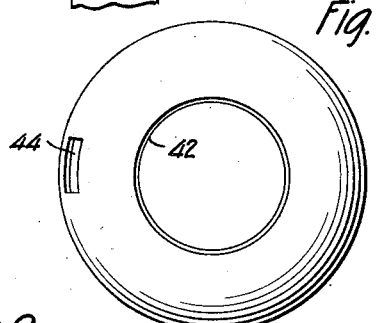

Figure 6 serves to show the shutter mentioned in describing Fig. 5.

Figure 7:
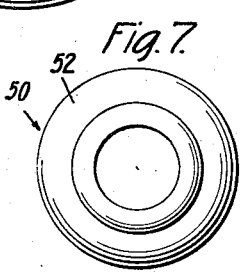

Figure 7 discloses the shutter clamp mentioned above.

Figure 8:
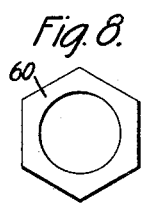

Figure 8 is taken, as are the two preceding views, in elevation and shows the clamping nut forming a part of the clamping devices mentioned.

Figure 9:
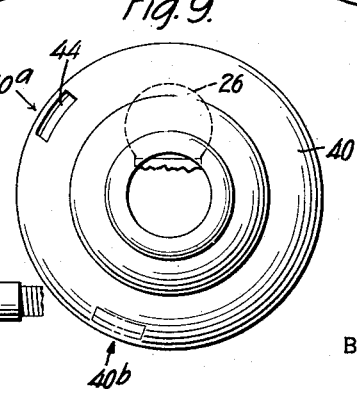

Figure 9 serves to show the operation of the shutter and its relation to the illuminator.

Figure 10:
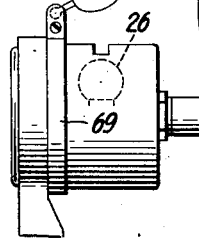

Figure 10 illustrates a further modification of the shutter shown in Figure 6.

For purposes of illustration the invention is shown as embodied in a distance type motor heat indicating instrument of the kind disclosed in the pending application of Herman Schlaich, Serial No. 145,358, filed October 30, 1926, for indicating means.

Figure 1:
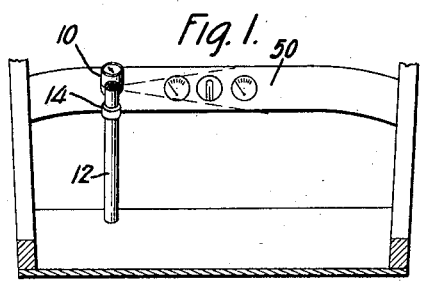
Figure 1 is a view, looking toward the front, of the forward compartment of a modern automobile, of the instruments mounted therein and thereon and of an embodiment of my invention in use.
Figure 2:
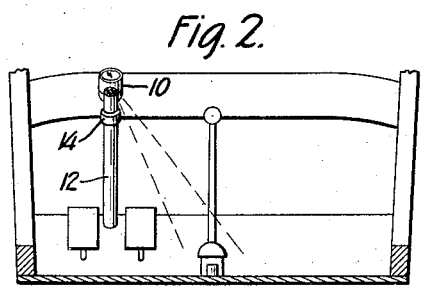
Figure 2 shows substantially the same devices illustrated in Fig. 1 but serves to illustrate another application of my invention.
Figure 3:
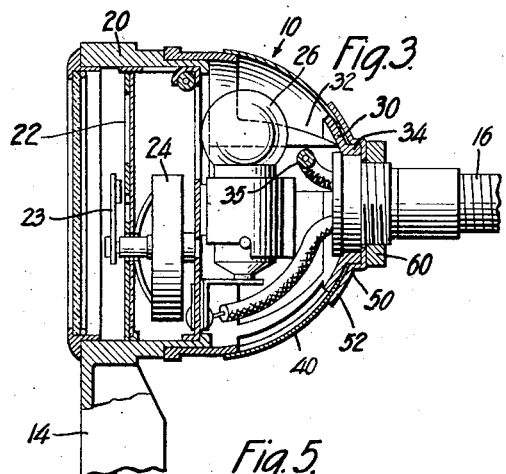
Figure 3 is a cross sectional elevation of an automobile instrument embodying my invention.
Figure 4:
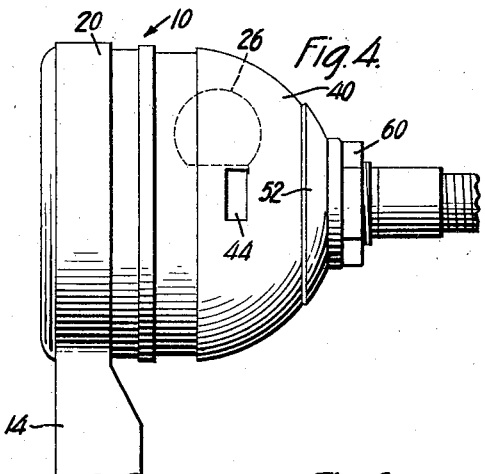
Figure 4 is an external elevation of the device shown in the preceding figure.

Referring to Figures 1 and 2 particularly:—An instrument 10 is attached to the steering post 12 of a motor vehicle by an adjustable bracket 14. Instrument 10 comprises an indicator 23 which receives actuation through a suitable conduit or connection 16 leading to the engine. This instrument (see Fig. 3) is provided with a casing 20, substantially cylindrical at its forward portion, wherein is mounted a translucent indicator dial 22. An indicator hand 23, actuated by the mechanism 24, moves across the dial. Behind the dial is mounted a lamp illuminator 26 whose rays fall upon the rear of, and shine through, dial 22, to render its graduations, and the position of hand 23, always visible.

The rear portion 30 of casing 20 is preferably hemispherical in shape and provided with openings 32, as shown in Fig. 5. Preferably at the center of rear portion 30 is provided a boss 34 having passage therethrough for the illuminator wires and instrument mechanism conduit drive 35. Over rear portion 30 fits a shutter 40 internally formed to fit closely over the hemispherical portion 30 of the casing 20 and to cover the openings 32 therein. Shutter 40 is of course open at its front end to fit over the casing and at its rear end has an opening 42 considerably longer than boss 34, thus permitting a very considerable movement of shutter 40 while lying over and upon portion 30 of casing 20. Shutter 40 is provided with an opening or aperture 44 therethrough. Movement of shutter 40 over casing 20 will adjust such opening 42 through a substantial range, as shown for example in Fig. 9;—one obtainable position of the opening 42 being shown at 40$^a$ and another at 40$^b$. It will be clear that the direction of such port with reference to the lamp 26 within the casing will determine the direction in which light from lamp 26 is projected. Thus by suitable adjustment of the shutter 40 a beam may be cast on the automobile instrument board 50 (as shown in Fig. 1), or upon the automobile floor and controls (as shown in Fig. 2), or elsewhere within the automobile compartment as desired. It will also be understood that by movement of shutter 40 so that opening 44 is over a solid portion 33 of the casing 20 the light will be confined to the interior of the casing and cut off from the automobile compartment, thus affording directional control of illumination or cut off as may be desired and either of these without affecting the primary function of illuminator 26 in lighting dial 22.

Shutter 40 is retained upon casing 20 by a clamping member 50 which is substantially larger than rear end opening 42 of shutter 40 so that its marginal portion 52 overlies the margin of the shutter bordering opening 42 in all adjusted positions of the shutter. The clamping member 50 has a central bore to receive boss 34. A clamping nut 60 is provided for applying pressure to the clamping member 50. Nut 60 is here shown as a separate element but it will be clear that it may be a part of clamping member 50 if desired and that these parts form a releasable holding means for shutter 40 permitting its adjustment, and the retention of such adjustment, as desired.

Adjustable bracket 14 permits the whole instrument to be adjusted bodily with reference to the steering column, while the instrument casing may be mounted in the bracket for rotary adjustment to orient the dial in the manner described in the Schlaich application hereinbefore referred to. After the bracket and instrument head have been set to the adjustment desired the shutter may be adjusted in the manner already described to control the projection of light from the instrument casing.

Manifestly my invention is applicable to other than the hemispherical instrument casing shown, and it will be understood that the shutter 40 may be a cylindrical band sliding over a like shaped casing or may embrace a still greater portion of the instrument casing and may carry a lens or mirror 70 adjustable thereon to permit even greater latitude of lamp ray adjustment as disclosed in Fig. 10. Such means provide an effective, cheap substitute for dash lamps and the like, rendering the same unnecessary.

What I claim is:

1. In an automobile instrument, a meter casing having an opening therein, an illuminator for said instrument mounted in said casing, and a shutter controlling the casing opening and having an aperture therein, to permit rays from the aforesaid illuminator to illuminate other automobile parts, said shutter being slidable upon the casing to adjust the position of the shutter aperture, and being effective to prevent the escape of light otherwise than through such aperture.

2. In a combined indicating instrument and illuminator for an automobile, an apertured instrument casing, a scale within said casing and forming a partition therein, an illuminator behind said scale and within said casing adjacent an aperture thereof, a shutter having an opening therein, said shutter being slidingly adjustable over said casing and being effective to prevent the escape of light otherwise than through the shutter aperture, and shutter clamping means for fixing the adjustment of said shutter to fix the shutter opening relative to the illuminator and thereby to control the direction of the light emitted from the casing.

3. In combination an indicating instrument comprising an apertured casing, indicator means, and a light in the casing for illuminating the indicator means, means for mounting the casing with provision for bodily and rotary adjustment, a shutter carried by the casing for controlling the emission of light from the casing, and means for securing the shutter in various adjusted positions relative to the casing to control the direction of the emitted light.

4. The combination with a steering column, of a bracket adjustably mounted thereon, and an indicating instrument carried by the bracket and comprising a translucent dial having a scale associated therewith, a casing, and a light in the casing behind the scale, said instrument being adjustable on the bracket to correctly orient the scale in accordance with the adjustment of the bracket, and said casing including a section having a light emitting opening therein for permitting light to escape in a desired direction, said casing section being adjustable with reference to the remainder of the casing to direct the light in the desired direction when adjustment of the instrument as a whole would otherwise result in misdirection of the light.

In testimony whereof I have affixed my signature to this specification.

HAROLD W. SMITH.